United States Patent
Andersson et al.

(10) Patent No.: US 7,769,391 B2
(45) Date of Patent: Aug. 3, 2010

(54) METHOD AND APPARATUS IN A TELECOMMUNICATION SYSTEM

(75) Inventors: Andreas Andersson, Landvetter (SE); Torbjörn Olsson, Sundbyberg (SE)

(73) Assignee: Elefonaktiebolaget L M Ericsson (Publ), Stockholm (SE)

( * ) Notice: Subject to any disclaimer, the term of this patent is extended or adjusted under 35 U.S.C. 154(b) by 554 days.

(21) Appl. No.: 11/816,720

(22) PCT Filed: Feb. 23, 2005

(86) PCT No.: PCT/SE2005/000285

§ 371 (c)(1),
(2), (4) Date: Aug. 21, 2007

(87) PCT Pub. No.: WO2006/091137

PCT Pub. Date: Aug. 31, 2006

(65) Prior Publication Data

US 2008/0268864 A1    Oct. 30, 2008

(51) Int. Cl.
    *H04Q 7/20* (2006.01)
(52) U.S. Cl. .................. 455/453; 455/452.2; 455/450; 370/329
(58) Field of Classification Search .............. 455/453, 455/452.1, 450; 370/329
See application file for complete search history.

(56) References Cited

U.S. PATENT DOCUMENTS

| | | | | |
|---|---|---|---|---|
| 6,128,506 | A * | 10/2000 | Knutsson et al. | 455/522 |
| 2002/0077113 | A1 * | 6/2002 | Spaling et al. | 455/453 |
| 2003/0083069 | A1 * | 5/2003 | Vadgama | 455/436 |
| 2006/0062171 | A1 * | 3/2006 | Baiamonte et al. | 370/328 |
| 2006/0215592 | A1 * | 9/2006 | Tomoe et al. | 370/315 |
| 2006/0256756 | A1 * | 11/2006 | Wakabayashi | 370/335 |
| 2008/0043623 | A1 * | 2/2008 | Franceschini et al. | 370/235 |

FOREIGN PATENT DOCUMENTS

WO    WO 00/65748    11/2000

OTHER PUBLICATIONS

3GPP TS 25.401 V6.4.0 (Sep. 2004) 3rd Generation Partnership Project; Technical Specification Group Radio Access Network; UTRAN overall description (Release 6).

3GPP TS 25.215 V5.5.0 (Sep. 2003)Universal Mobile Telecommunications System (UMTS): Physical layer; Measurements (FDD) (3GPP TS 25.215 version 5.5.0 Release 5).

3GPP TS 25.214 V5.10.0 (Dec. 2004) Universal Mobile Telecommunications System (UMTS); Physical layer procedures (FDD) (3GPP TS 25.214 version 5.10.0 Release 5).

(Continued)

*Primary Examiner*—Danh C Le
(74) *Attorney, Agent, or Firm*—Roger S. Burleigh (57) ABSTRACT

The present invention relates in general to the radio communications field and, in particular, to a method and apparatus for detecting congestion in a spread spectrum Code Division Multiple Access (CDMA) cellular communication system. By measuring the number of Signal-to-Interference Ratio Error reports being received at the Radio Network Controller a potential congestion can be detected in the cell when the number of reports being received is above a threshold. Further can a differentiation be made between a potential or a serious congestion and different actions be performed dependant on if a potential or a serious congestion is detected.

29 Claims, 5 Drawing Sheets

OTHER PUBLICATIONS

3GPP TS 25.101 V3.17.0 (Mar. 2004) Universal Mobile Telecommunications System (UMTS); User Equipment (UE) radio transmission and reception (FDD) (3GPP TS 25.101 version 3.17.0 Release 1999).

3GPP TS 25.133 V6.8.0 (Dec. 2004) Universal Mobile Telecommunications System (UMTS); Requirements for support of radio resource management (FDD) (3GPP TS 25.133 version 6.8.0 Release 6).

3GPP TS 25.433 V5.11.0 (Dec. 2004) Universal Mobile Telecommunications System (UMTS); UTRAN Iub interface NBAP signaling (3GPP TS 25.433 version 5.11.0 Release 5).

* cited by examiner

METHOD AND APPARATUS IN A TELECOMMUNICATION SYSTEM

TECHNICAL FIELD OF THE INVENTION

The present invention relates in general to the radio communications field and, in particular, to a method and apparatus for detecting congestion in a spread spectrum or Code Division Multiple Access (CDMA) cellular communication system, here exemplified as a WCDMA system compliant to the 3GPP specifications.

DESCRIPTION OF RELATED ART

Good transmit power control methods can be important to communication systems having many simultaneous transmitters because such methods reduce the mutual interference of such transmitters. For example, transmit power control is necessary to obtain high system capacity in interference limited communication systems, e.g., those that use wideband code division multiple access (WCDMA). Depending upon the system characteristics, power control in such systems can be important for the uplink (i.e., for transmissions from a User Equipment to the network), the downlink, (i.e., for transmissions from the network to the User Equipment) or both.

In a typical WCDMA system, an information data stream to be transmitted is superimposed on a much-higher-bit-rate data stream produced by a pseudorandom code generator. The information signal and the pseudorandom signal are typically combined by multiplication in a process sometimes called coding or spreading the information signal. Each information signal is allocated a unique spreading code. A plurality of coded information signals are transmitted as modulations of radio frequency carrier waves and are jointly received as a composite signal at a receiver. Each of the coded signals overlaps all of the other coded signals, as well as noise-related signals, in both frequency and time. By correlating the composite signal with one of the unique spreading codes, the corresponding information signal can be isolated and decoded.

The need for transmit power control in WCDMA cellular systems, as may be seen from the uplink is recognized in current 3GPP specifications (e.g. 3GPP TS 25.214 Physical Layer Procedures (FDD), 3GPP TS 25.101 User Equipment (UE) radio transmission and reception (FDD)).

Uplink power control according to the 3GPP standard is provided by, among other techniques, a closed-loop method in which a Radio Base Station measures the strength of a signal received from a User Equipment (e.g., relative to its associated noise) and then transmits power control commands to the User Equipment 1500 times per second. Based on the power control command, the User Equipment increases or decreases its transmit (uplink) power by a predetermined amount. Typically such a step is +1 dB or −1 dB.

This technique for controlling transmit power in radio communication systems is commonly referred to as a fast power control loop. The initial SIR target (SIRt) is established based upon a desired quality of service (QoS) for a particular connection or service type. For non-orthogonal channels, the actual Signal-to-Interference Ratio SIR values experienced by a particular first User Equipment UE1 or first Radio Base Station RBS1 in FIG. 1 can be expressed as:

$$SIR = \frac{\text{Mean power of received signal}}{\text{Sum of the mean powers of all interfering signals}} \quad (1)$$

or $$SIR = \frac{RSCP}{ISCP} \cdot SF, \quad (2)$$

where RSCP is the Received Signal Code Power, ISCP is the Interference Signal Code Power and SF is the Spreading Factor of the UL DPCCH (Uplink Dedicated Physical Control Channel) for the particular User Equipment, see 3GPP TS 25.515 V5.5.0.

Figure 1:
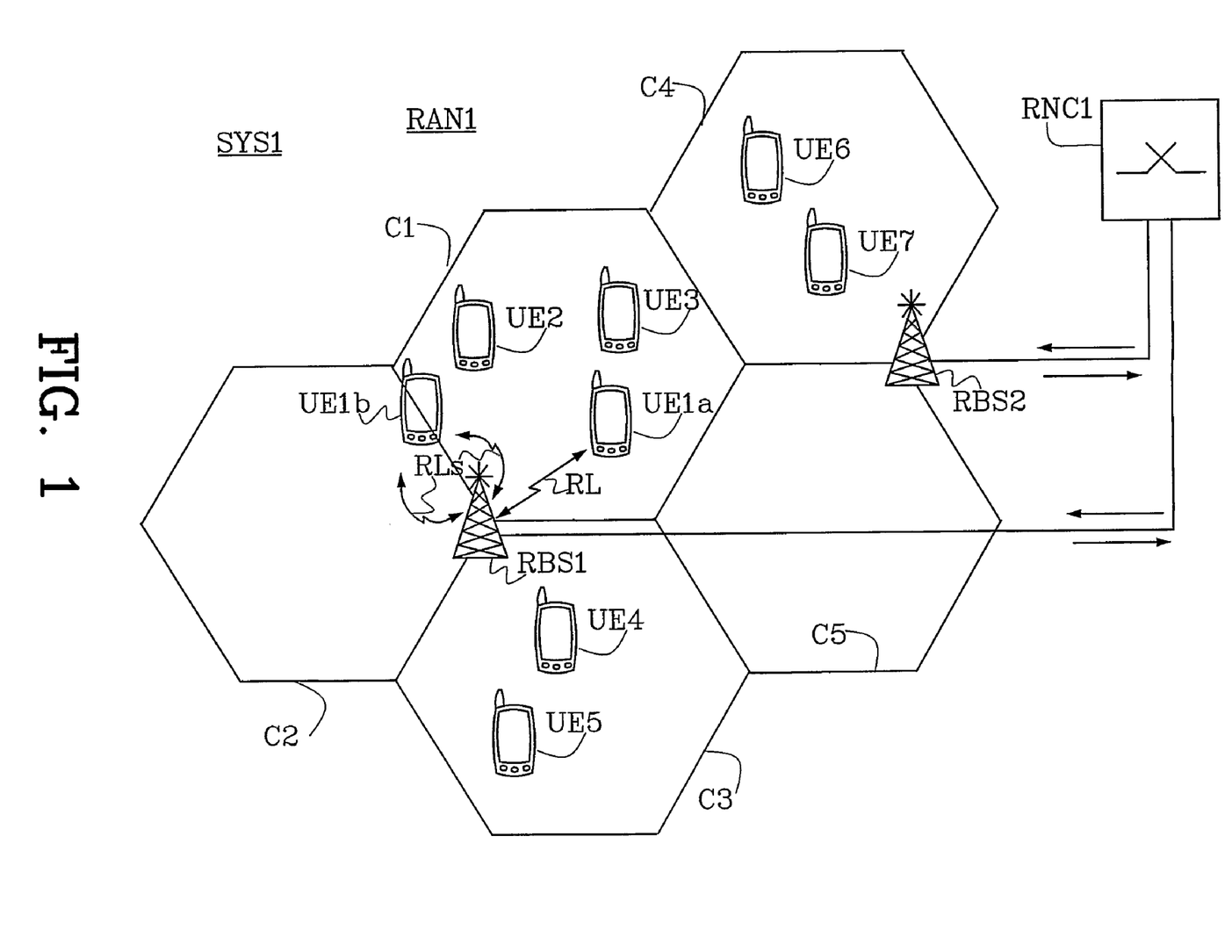
FIG. 1 is a schematic diagram of a radio communication system comprising a radio communication network and user equipments.
Figure 2:
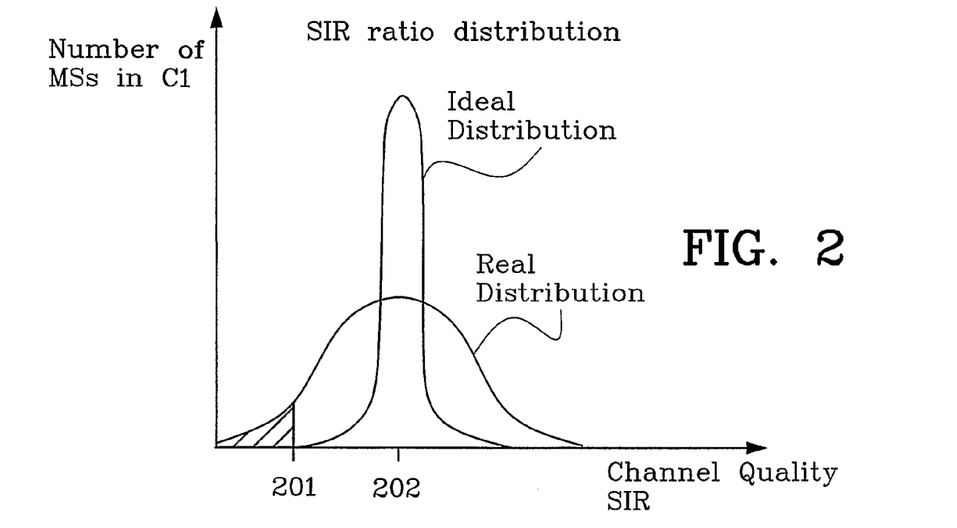
FIG. 2 is a curve chart illustrating SIR distribution for user equipments in a radio communication system.

Ideally the power control would make all users in FIG. 1 experience the same Signal-to-Interference Ratio SIR, see the ideal distribution curve in FIG. 2. In reality this is far from true, see the real distribution curve in FIG. 2, and there are several reasons for this. First of all, there is a maximum possible output power. One other issue with power control is that it affects other users. A power change will not only change the Signal-to-Interference Ratio SIR for the controlled link but it also change the Signal-to-Interference Ratio SIR for other links since it changes the interference level. This means that even in systems with power control, different User Equipments will experience different Signal-to-Interference Ratio SIR. Ideally no User Equipments will obtain a Signal-to-Interference Ratio SIR below point 201 in FIG. 2, see the dashed area. When all User Equipments experience an optimal Signal-to-Interference Ratio SIR the Ideal Distribution curve can be obtained.

The Signal-to-Interference Ratio SIR is measured by the receiving party (e.g. first User Equipment UE1 or Radio first Base Station RBS1) and is used for determining which power control command is sent to the transmitting party (e.g. first Radio Base Station RBS1 or first User Equipment UE1). The Radio Link RL is a logical association between a single User Equipment UE and a single Radio Access Network RAN access point. Illustrated in FIG. 1 by first User Equipment UE1$a$ and Radio Link RL. Its physical realisation comprises one or more radio bearer transmissions. Radio Access Network RAN access point is a conceptual point within the Radio Access Network RAN performing radio transmission and reception. A Radio Access Network RAN access point is associated with one specific cell, i.e. there exists one Radio Access Network RAN access point for each cell. Signal-to-Interference Ratio SIR can also be measured for a Radio Link Set RLS. The Radio Link Set RLS is a set of one or more Radio Links that has a common generation of Transmit Power Control (TPC) commands in the Downlink DL (see 3GPP TS 25.401 V6.4.0). Illustrated in FIG. 1 by first User Equipment UE1$b$ and Radio Link Set RLS.

A slow power control loop can then be used to adjust the SIR target (SIRt) value on an ongoing basis. For example, the User Equipment can measure the quality of the signals received from the User Equipment using, for example, known Bit Error Rate (BER) or transport Block Error Rate (BLER) techniques. Based upon the received signal quality, which may fluctuate during the course of a connection between the Radio Base Station and a User Equipment, the slow power control loop can adjust the SIR target (SIRt) that the fast power control loop uses to adjust the Radio Base Stations transmitted power. Similar techniques can be used to control uplink transmit power.

Different radio communication services, for example, support for facsimile, e-mail, video, Internet access, etc can be provided for the User Equipment UE. It can also be provided for the User Equipment to access different types of services at the same time. For example, a videoconference between two users would involve both speech and video support. One technique for handling the different types of data communication involved in these situations is to provide a different radio bearer for each service. A radio bearer provides the capability for information transfer over the radio interface and is characterized by attributes such as information transfer rate (i.e., bit rate or throughput) and delay requirements, etc. A radio bearer carries either user data or control signaling. Typically a bearer is used for a specific service, e.g., speech. A radio bearer may span several physical channels or multiple radio bearers may share a physical channel depending on the bandwidth requirements of each radio bearer. In addition to one or more physical data channels (DPDCHs), the user will be allocated a physical control channel (DPCCH) on which overhead control information is carried to the user, e.g., bit rate information of the associated DPDCHs, transmit power control bits and pilot symbols, at a constant bit rate, which can be used to make the SIR measurements used in the fast power control loop process. The various services, and therefore radio bearers, may have different QoS requirements.

In e.g. International patent application WO 00/65748 discloses a transmission power control method and system whereby an estimate of the achieved SIR is used as an additional parameter for the outer power control loop function. When the QoS and achieved SIR are both too low, the QoS is ignored and the SIR target value is instead controlled by the achieved SIR. Similarly, when both QoS and achieved SIR are too high, the QoS is ignored and the SIR target value is instead controlled by the achieved SIR.

Uplink UL interference is one measure of Uplink UL load. However, it is difficult to measure an absolute signal strength level such as interference, compared to a relative measure as Signal-to-Interference SIR.

It is especially for WCDMA system hard to control the Uplink UL load, being so sensitive, as all User Equipments are sending at the same time.

Accordingly, it would be highly desirable to provide a radio communication system, where the interference stays on an optimal level on the Uplink UL, or if the interference goes beyond an optimal level on the Uplink UL, it is at least desirable to detect this and by that avoid congestion for User Equipments in a cell in a radio communication system.

SUMMARY OF THE INVENTION

The problem dealt with by the present invention is estimating UL load accurately and doing it cost efficient to detect and avoid congestion for User Equipments in a cell without limiting the capacity.

Briefly, the present invention solves said problem by measuring the number of Signal-to-Interference Ratio Error reports being received, and detecting a potential congestion in the cell when the number of reports being sent is above a threshold.

One object of the invention is to provide an enhanced congestion detection of User Equipments in a cell, which is simple and inexpensive.

Yet another object of the invention is to provide an improved accuracy in detecting congestion of User Equipments in a cell.

Still another object is to differentiate between a potential congestion (at1) and a serious congestion (et1,at2-at3) of User Equipments in a cell to obtain a flexible way of operating the User Equipments to avoid a potential congestion or improve a serious congestion in the cell.

An advantage afforded by the invention is an enhanced congestion detection of User Equipments in a cell, which is simple and inexpensive.

Yet another advantage of the invention is an improved accuracy in detecting congestion of User Equipments in a cell.

Still another advantage is that it is possible to differentiate between a potential congestion and a serious congestion of User Equipments in a cell and a flexible way of operating the User Equipments is obtained avoiding a potential congestion or improving a serious congestion in the cell.

Still further another advantage is if it is possible to detect that the User Equipments in a cell is approaching instability, but the cell is still stable, softer and potentially more direct actions can be taken since there is still some time before the cell goes unstable.

Other objects, advantages and novel features of the invention will become apparent from the following detailed description of the invention when considered in conjunction with the accompanying drawings and claims.

DESCRIPTION OF PREFERRED EMBODIMENTS

Consider the exemplary first cell C1 depicted in FIG. 1. Therein, a first Radio Base Station RBS1 is currently handling a connection with first User Equipment UE1a,UE1b a second and a third User Equipment UE2-UE3 in first Cell C1. It can also be seen a fourth cell C4 wherein a second Radio Base Station RBS2 is handling sixth and seventh User Equipments UE6-UE7, and further fifth cell C5. The first Radio Base Station RBS1 is also handling User Equipments fourth and fifth UE4-UE5 in third Cell C3 and second Cell C2 is empty. Of course, those skilled in the art will appreciate that first Radio Base Station RBS1 would typically support connections with many cells (e.g. C1-C3) and many User Equipments (e.g. UE1-UE5) concurrently, however interaction between a single first User Equipment UE1a on Radio Link RL or UE1b on Radio Link Set RLs, and the network is sufficient to illustrate power control techniques involved when detecting a congestion in first cell C1 according to the present invention.

For the purposes of this exemplary embodiment, consider that the system depicted in FIG. 1 operates using a CDMA technology with duplexed downlink (i.e. base-to-user equipment direction) and uplink (i.e. user equipment-to-base direction) channels. In this example, first User Equipment UE1 has been allocated a dedicated physical channel. In the context of this exemplary WCDMA system, a physical channel is identified by its code (i.e. short, long or combination thereof), frequency and bandwidth. In the downlink, first Radio Base Station RBS1 transmits to first User Equipment UE1 using a certain power level associated with the dedicated downlink physical channel. In the uplink, first User Equipment UE1 communicates with first Radio Base Station RBS1 using a certain power level associated with the dedicated uplink physical channel. The first Radio Base Station RBS1 is in communication with Radio Network Controller RNC1 and then on to a mobile switching center (MSC), not shown, which in turn is connected to a public switched telephone network (PSTN), not shown.

Figure 3:
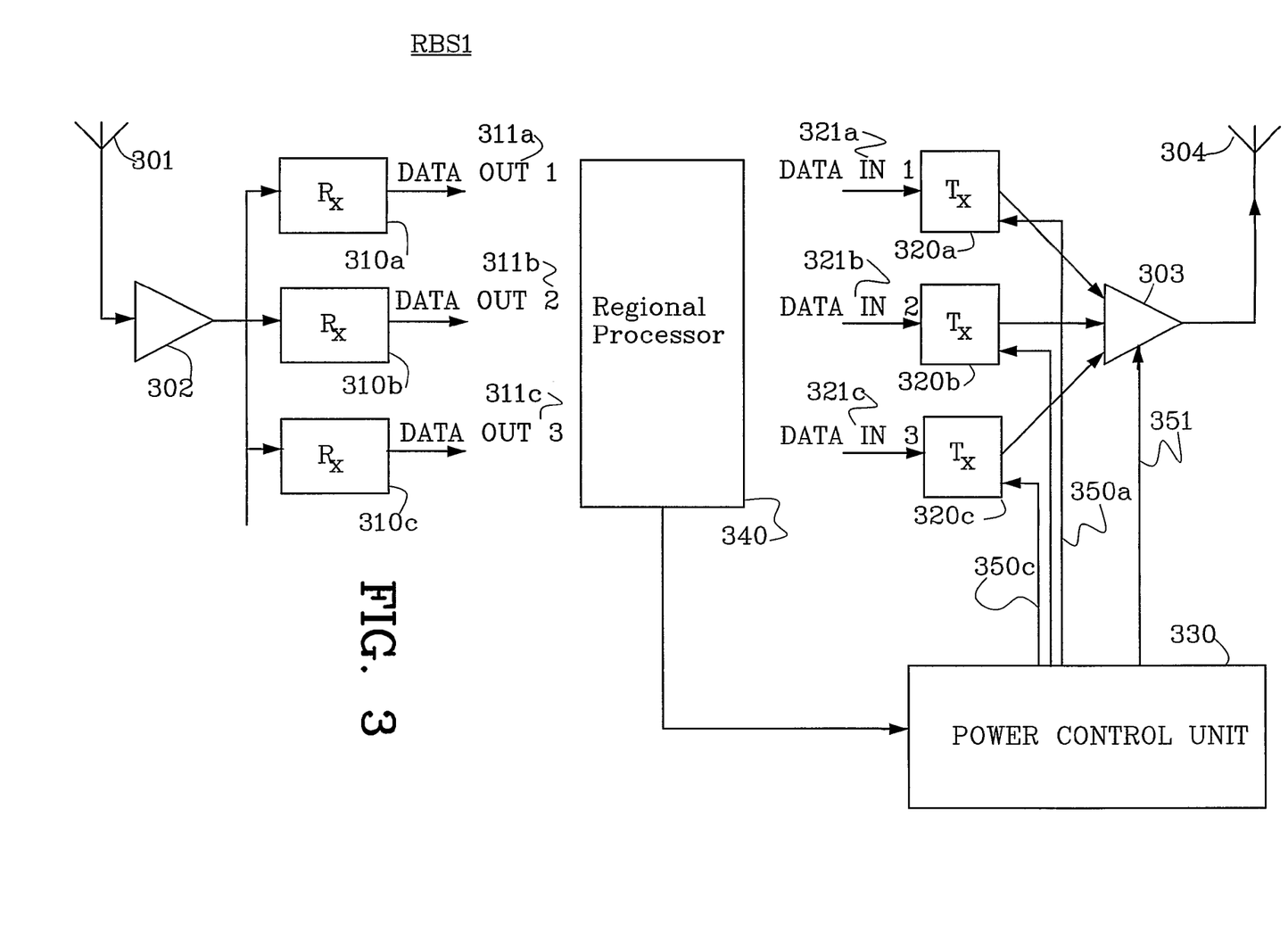
FIG. 3 is a block diagram illustrating a radio base station.

As illustrated in FIG. 3, first Radio Base Station RBS1 includes a receive antenna 301 for receiving signals from, e.g., first User Equipment UE1. The received signals can, for example, be amplified at block 302 and processed by each of a plurality of receive signal processing blocks 310a, 310b, 310c . . . , only three of which are illustrated for simplicity. The particular details associated with decoding/demodulating WCDMA signals are known to those skilled in the art and, accordingly, will not be further described herein. However, each of the receivers 310a, 310b and 310c could, for example, include correlators associated with the code words corresponding to the dedicated channel allocated to the particular user such that the data transmitted by first User Equipment UE1 over these physical channels was extracted and provided to regional processor 340 over lines DATA OUT 311a, DATA OUT 311b and DATA OUT 311c, respectively. In addition to processing the extracted data for other purposes, regional processor 340 receives the transmit power control commands transmitted by first User Equipment UE1 as a result of the User Equipment units power control loops.

Thus, information is passed from regional processor 340 to power control unit 330, which uses the power control commands to adjust the transmit power of transmitters 320a, 320b and 320c and amplifier 303 as described below. Regional processor 340 also analyzes in Uplink UL the received signals to determine the Signal-to-Interference Ratio SIR experienced by first Radio Base Station RBS1 (e.g., as described in Equation (1) and (2)) and to determine a quality measure for the received uplink signals (e.g., Bit Error Rate (BER) and/or transport Block Error Rate (BLER)). In uplink for example described for first User Equipment UE1, the first Radio Base Station RBS1 analyzes the obtained Signal-to-Interference Ratio SIR, on the Dedicated Physical Control Channel DPCCH, as measured for User Equipment UE1 in first Cell C1, compared to the interferences from the User Equipments UE2-UE3 in the same cell C1, and from surrounding User Equipments, e.g. the User Equipments UE4-UE5 in third Cell C3 and nearby User Equipments UE6-UE7 in fourth Cell C4. From the obtained Signal-to-Interference Ratio SIR and a Signal-to-Interference Ratio Target SIRt the value of Signal-to-Interference Ratio Error SIRe is estimated on the Radio Link or Radio Link Set RL/RLS, associated with e.g. the first User Equipment UE1 in first Cell C1, on the Dedicated Physical Control Channel DPCCH. This is further illustrated in FIG. 5 by arrow 510 from first User Equipment UE1 to first Radio Base station RBS1.

If the value of Signal-to-Interference Ratio SIR is "low" it means that the first User Equipment UE1 is sending with its maximum power, but the Quality of Service (QoS) is too "low" to get adequate transmission. The cause may be that the first User Equipment UE1 is e.g. encountering a shadow fading, as the first User Equipment UE1 moves, transmissions can be hindered by large objects, such as trees or buildings.

Figure 5:
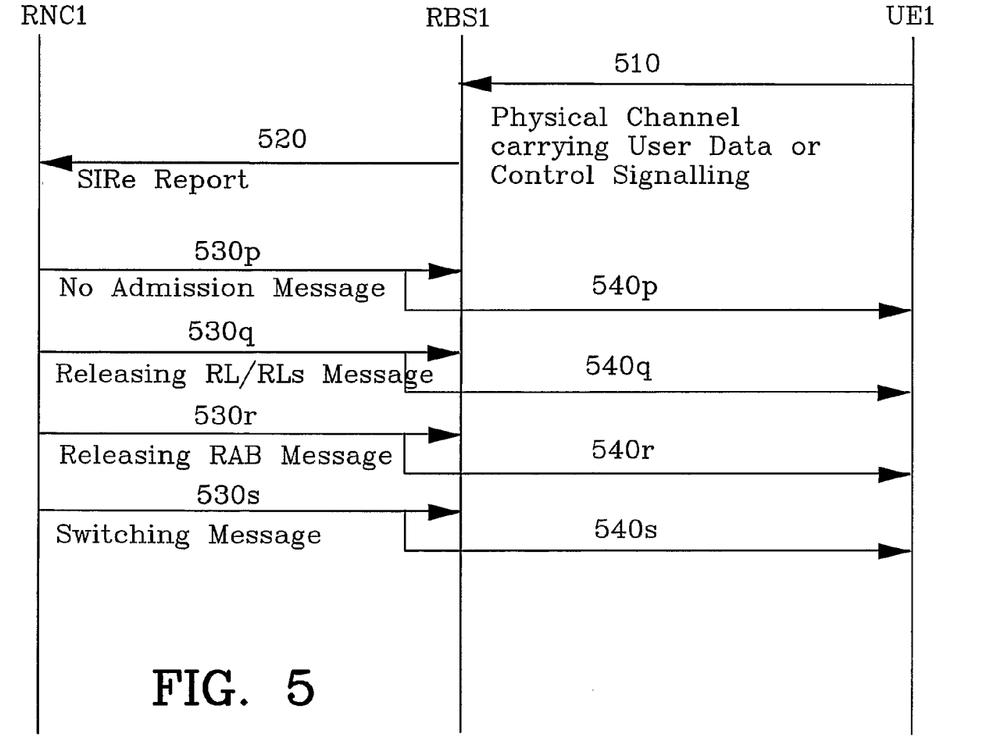
FIG. 5 is a signal diagram illustrating an exemplary communication flow between a user equipment, radio base station and a radio network controller according to the present invention.

In first Radio Base Station RBS1a SIR Error Threshold is set for e.g. first Cell C1, by the Radio Network Controller RNC1, where the first Radio Base Station RBS1 is operating, and it may be changed accordingly, see 3GPP specification (e.g. 3GPP TS 25.133 and 3GPP TS 25.433). The SIRe measurements, described above, estimated from SIR and SIRe, are e.g. calculated during a predetermined time period for a Radio Link or Radio Link set RL/RLS, associated with e.g. the first User Equipment UE1 in first Cell C1. When the result from the SIRe measurements, the SIRe value associated with e.g. first User Equipment UE1 is above, equal, or below (preferably below according to 3GPP TS 25.215) SIRe Threshold in Radio Base Station RBS1, set by the Radio Network Controller RNC1, result in a SIRe report is sent, e.g. event triggered, from the RBS (e.g. RBS1) to the Radio Network Controller RNC1 that controls the radio resources, see 3GPP specifications (e.g. 3GPP TS 25.215 Physical layer-Measurements (FDD)). Event triggered SIRe reports are e.g. sent after SIRe Threshold set in first Radio Base Station RBS1 is passed (e.g. below SIRe Threshold), and can e.g. also be followed by a positive SIRe report being sent for the User Equipment which suddenly gets an improved SIRe value (e.g. above SIRe Threshold). The SIRe reports can also be sent with a certain frequency independent of a SIRe Threshold is passed or SIRe reports can be sent with a certain frequency during the period after SIRe Threshold has been passed until a positive SIRe report can be sent, see 3GPP specification (e.g. 3GPP TS 25.215). The SIRe report contain at least the SIRe value itself. Illustrated in FIG. 5 by SIRe report arrow 520 from RBS1 to RNC1. Further in FIG. 5 is illustrated, according to an exemplary embodiment of the invention, what actions that for example can be taken when a potential or a serious congestion is detected, see arrow 530p,530q,530r, 530s. The action message is transmitted from the Radio Network Controller RNC1 to the first Radio Base Station RBS1 530p,530q,530r,530s and then further to the first User Equipment UE1 540p,540q,540r,540s.

Figure 4:
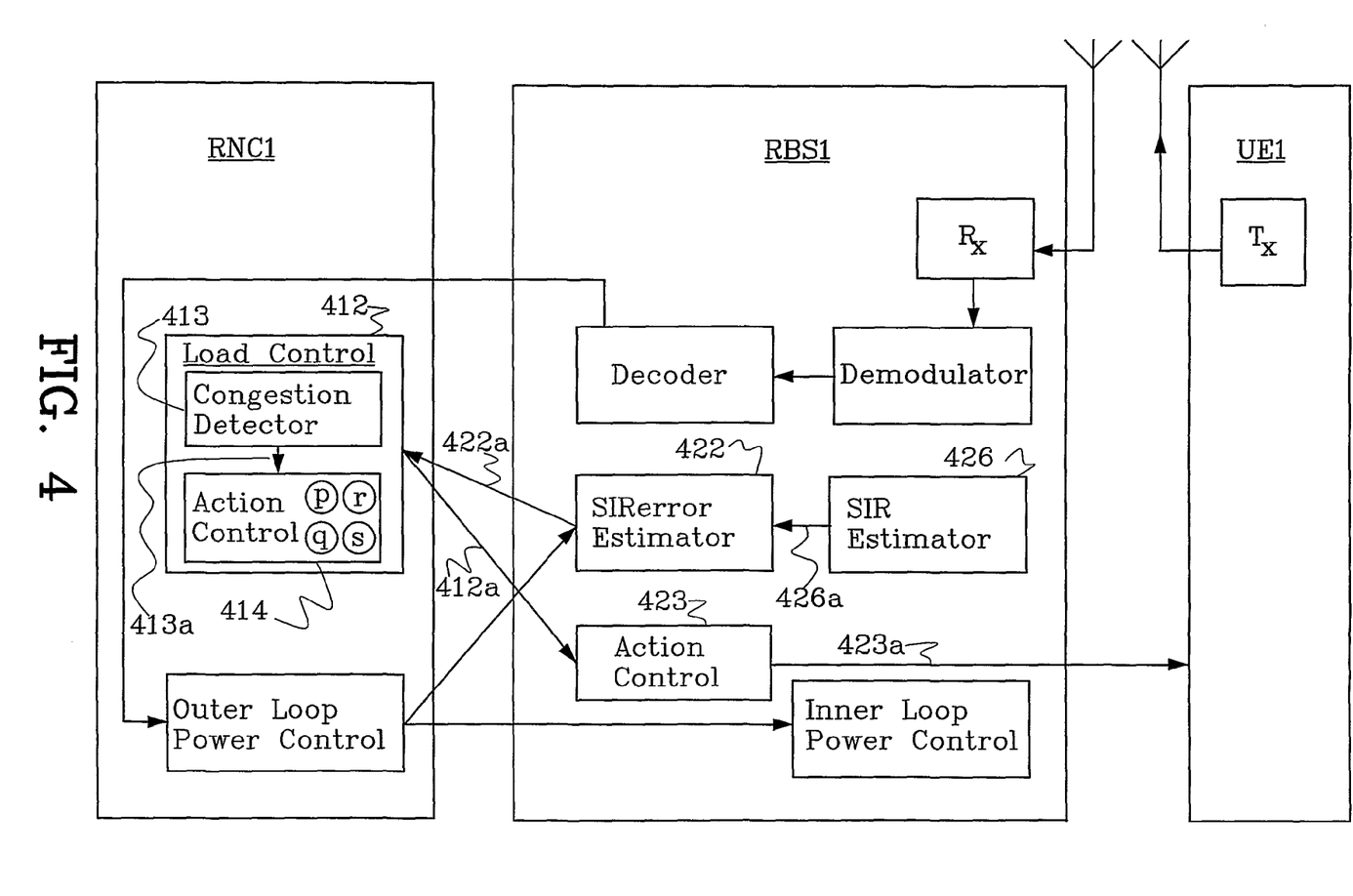
FIG. 4 is a block diagram illustrating radio communication system comprising an exemplary radio network controller according to an exemplary embodiment of the present invention.

In FIG. 4 it is illustrated a SIRerror Estimator 422 which by an input signal 426a from the SIR estimator 426 is associated with the Radio Link/Radio Link Set RL/RLs for e.g. first User Equipment UE1. Further the SIRerror Estimator 422 is sending a SIRe report signal 422a to the Load Control 412. The Load Controller 412 acts as a means for receiving the SIRe report. In an exemplary arrangement according to the invention, here illustrated in FIG. 4, a Congestion Detector 413 and an Action Controller 414, are both incorporated in the Load Controller 412. As a person skilled in the arts appreciates the Load Controller 412 with the incorporated Congestion Detector 413 and the Action Controller 414 can be placed anywhere in the Radio Network Controller RNC1, and be either software or hardware implemented. A SIRe report 422a is e.g. sent to the Load Controller 412 when the measured SIRe value is below the SIRe Threshold set by the Radio Network Controller RNC1 in the first Radio Base Station RBS1, see the description above. According to the invention, based upon a sufficient Amount of users (at1—configurable) for which the SIR Error SIRe report is received at the Radio Network Controller RNC1, the Congestion Detector 413 acts as a means for detecting a potential congestion in the cell (e.g. C1). In FIG. 4 it is illustrated being performed by the Congestion Detector 411, an exemplary embodiment according to the invention, suggested to be included in the Load Control 412. Further according to one embodiment of the invention, the Congestion Detector 413 acts as a means for differentiating between a potential or a serious congestion in a cell by having different threshold values (at1,at2,at3,et1). For example the thresholds that detect a potential (first Amount Threshold-at1,second Amount Threshold-at2) or a serious congestion (third Amount Threshold-at3,first Error Threshold-et1) can be varied. The threshold for the amount of SIRe reports received by the receiving means that result in any action at the Radio Network Controller RNC1 can be varied, so for example a higher Amount Threshold (e.g. at3) result in a serious congestion compared to a lower Amount Threshold (e.g. at2 when at3>at2) result in only a potential congestion. A relative threshold value (a fraction e.g. 30% of all User Equipments UE1-UE3 in first Cell C1, i.e. UE1/(UE1+UE2+UE3)), the Amount Threshold at2, can be used as a value when SIRe reports received, by the receiving means, are compared by the detecting means, to the amount of radio links/radio link sets RLs/RLSs being connected in a cell. A time period can be determined for when and for how long time the amount of SIRe reports shall be measured by the Congestion Detector 413 acting as means for detecting. It can e.g. be measured during a certain time window that can be moved in time. When a potential or serious congestion is detected by the means for detecting in the Congestion Detector 413, different actions, by the means for allowing 414p, releasing 414q,414r, switching 414s in the Action Controller 414, can be taken to avoid the real congestion in the cell (e.g. C1). In FIG. 4, the Congestion Detector 413 signal 413a to an Action Controller 414. The Congestion Detector 413 detects a potential or a serious congestion by receiving SIRe reports by the receiving means and measuring the amount of SIRe reports by the means for measuring the amount of SIRe reports and detecting a potential detection by means for detecting. The means for detecting can detect a potential or a serious congestion compared to a SIRe Threshold, also described down below related to FIG. 6. The action signal is illustrated as arrow 412a in FIG. 4 or 530p,530q,530r,530s in FIG. 5. The action signal messages 412a,530p,530q,530r, 530s are read by the Action Controller 423 in the first Radio Base Station RBS1, and further instructions signals 423a are sent to associated User Equipments UE1, illustrated by arrow 540p,540q,540r,540s in FIG. 5. The Action Controller 414 acts e.g. as a means for allowing no admission of new user equipments (UE4-UE7) in e.g. the first cell C1, if a potential congestion or a serious congestion is indicated. Further it can act as a means 414q for releasing the Radio Link/Radio Link set RL/RLS for at least one User Equipment UE1, if a potential congestion or a serious congestion is indicated. Yet further it may act as a means 414r for releasing Radio Access Bearers RABs for at least one User Equipment UE1, if a potential congestion or a serious congestion is indicated. It may act as a means 414s for switching a dedicated physical channel for at least one User Equipment UE1 to a common physical channel, if a potential congestion or a serious congestion is indicated. The Action Controller 414 acts as a means for allowing 414p, releasing 414q,414r, and switching 414s, in an order according to a known algorithm or in a predetermined order for at least one User Equipment UE1 in a cell C1. For example the means for allowing no admission for new user equipment is operating when a potential congestion is detected, while for example when a serious congestion is detected the means for releasing the Radio Link/Radio Link set RL/RLs is also included operating for at least one User Equipment UE1. Another example could be to differentiate between a serious congestion by having the means for allowing no admission of new User Equipment UE1 operating as well as the means 414q for releasing the radio link/radio link set RL/RLS for at least one User Equipment UE1 in the cell C1. And when for example a potential congestion is detected the means for releasing the radio link/radio link set RL/RLS is not operating instead is means 414r for releasing radio access bearers RABs for at least one User Equipment UE1 operating.

The different actions according to one exemplary embodiment to the invention, to be taken for the cell (e.g. C1) are e.g. allowing no admission of new users in the first Cell C1, releasing the Radio Link/Radio Link Set RL/RLs for the first User Equipment UE1, or releasing associated Radio Access Bearers RABs for the first User Equipment UE1, or switching a dedicated channel for the first User Equipment UE1 to a common channel.

Different types of services, e.g. speech, video and email, have large differences in Quality of Service QOS requirements and coding schemes. Therefore when different radio bearers is assigned to one user a certain Radio Access Bearer RAB can be released to improve the congestion in the cell. According to the invention one of the actions to be taken when a potential and/or serious congestion is detected is e.g. to release a Radio Access Bearer RAB for first User Equipments UE1. A Radio Access Bearer RAB with a high quality of service QoS can be released while another with lower quality of service QoS can be allowed to keep transmitting. If Radio Access Bearers RABs can be released that requires high QoS, and equally requires high power levels for first to third User Equipments UE1-UE3 in first Cell C1, a congestion can be avoided in the first Cell C1, as the total transmit power and the interference to other users can be lowered.

The actions to be taken, can be one or more, and be for one (e.g. UE1) or more User Equipments (e.g. UE1-UE3) in the cell (e.g. C1). The action can firstly be chosen to take place for the User Equipment with worst SIRe value in the SIRe report and then further secondly it can be decided to go for the next worse User Equipment etc. The action can be chosen to take place for all User Equipments having sent a SIRe report, e.g. during a certain time period, or for all User Equipments having sent a SIRe report with a SIRe value below a Error Threshold et1.

For example can SIRe be measured according to SIRe=SIR−SIRt. Then an optimal SIRe value is one as close to zero as possible, and a negative SIRe is most common as the SIRt normally is higher than the SIR experienced by the User Equipment. The User Equipment experiencing the worse SIRe value in a group of many User Equipments is then one with the most negative SIRe.

Figure 6:
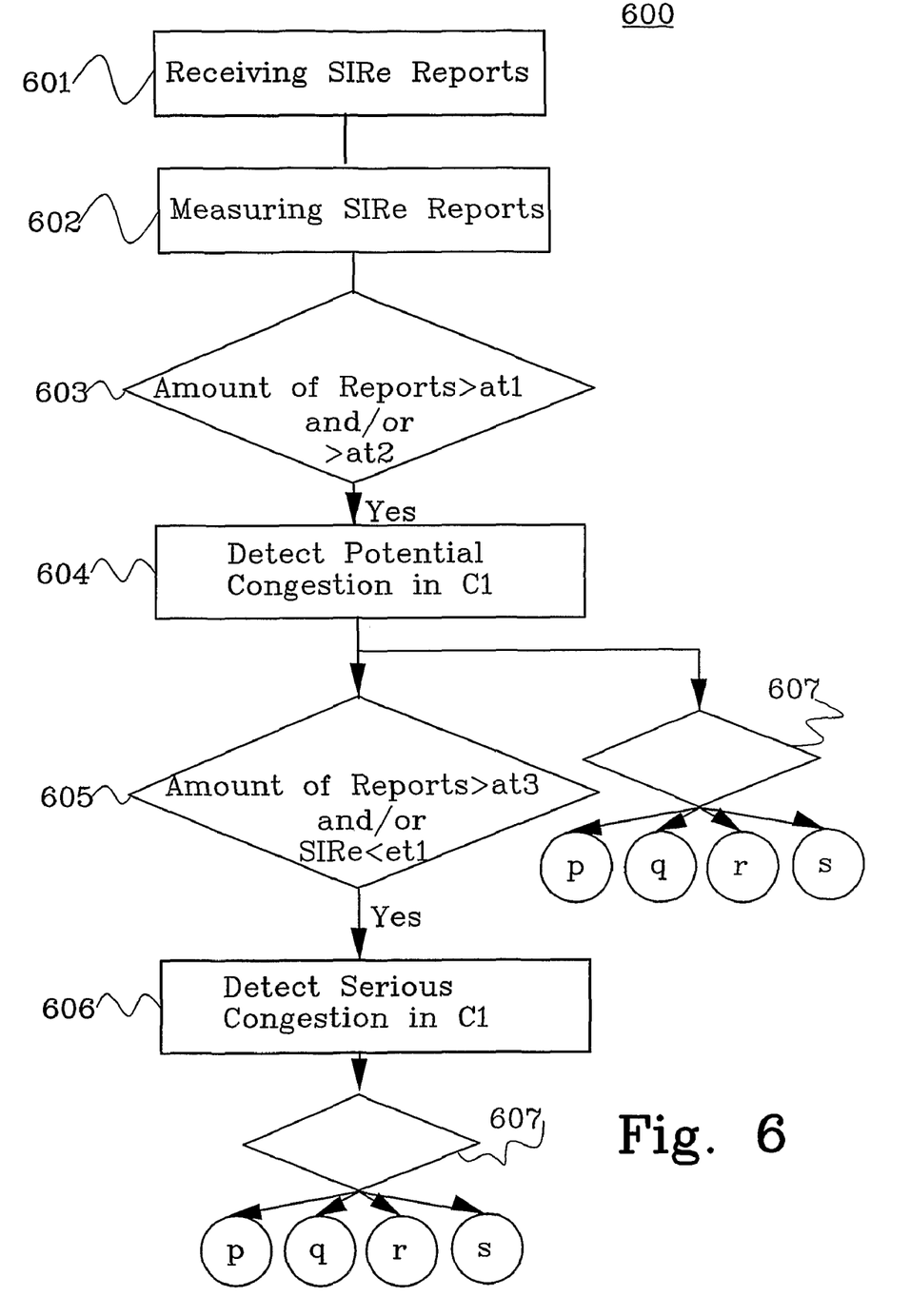
FIG. 6 is a flow chart illustrating an exemplary method for detecting congestion in a cell according to the invention.

The flowchart 600 of FIG. 6 illustrates an exemplary embodiment of the invention according to which a normal reporting system with SIR Error SIRe reports being received at the first Radio Network Controller RNC1 is modified to incorporate the congestion detection of User Equipments in a first Cell C1. In first step 601, a plurality of SIRe reports are being received, the Signal-to-Interference Ratio Error SIRe reports are each estimated on measured Signal-to-Interference Ratio SIR and Signal-to-Interference Ratio target SIRt, associated by the Radio Link or Radio Link set RL/RLs used by e.g. first User Equipment UE1. In next step 602, the SIRe report has been received, and the Amount of SIRe reports is measured for the first Cell C1. Further in step 603, the Amount of SIRe reports measured is compared to a Threshold of a certain first Amount (at1) of SIRe reports. If the Amount of SIRe reports is above the certain first Amount Threshold at1, in step 604 a potential congestion is detected in first Cell C1. In step 603 if the Amount of SIRe reports measured is compared to the amount of Radio Links/Radio Link sets RLs/RLSs being connected in said first cell C1, a potential congestion in the first cell C1 can also be detected, if the relative measure value e.g. is above a certain second amount threshold (at2) for said first cell (C1).

It can also be described as a potential congestion detection can be made if a fraction e.g. 30%, of first to third User Equipments UE1-UE3, in the first Cell C1 is the amount SIRe reports set to the be the level for which a congestion is detected, i.e. estimated on if the amount of reports being received for the first Cell C1 compared to the amount of Radio Links/Radio Link Sets RLs/RLSs being connected in the first cell C1 are above a certain second amount threshold (at2) for the first cell C1.

In step 605 the Amount of SIRe reports measured is compared to a certain third Amount Threshold (at3) of SIRe reports. If the Amount of SIRe reports is above the certain third Amount Threshold at3, in step 606 a serious congestion is detected in first Cell C1. Further can a serious congestion be detected if not only the amount of SIRe reports being above the certain third amount threshold at3 for the first cell C1, but also are having a SIRe below a certain first error threshold et1. Further in step 607, dependent on if a potential or a serious congestion is detected up to three different actions described in method steps (q,r,s) for at least one User Equipment (UE1) can be performed, and one action as a method step (p) where no admission of new User Equipments are allowed. Further method steps and means for performing the methods may be applicable, as a person skilled in the art appreciates, described in CDMA based cellular communication system specifications for improvements of SIR for a user equipment. In step p no new admission of new user equipments are allowed in the first Cell C1, further in step q a Radio Link or Radio Link Set RL/RLs can be released for at least one user equipment. The release of a Radio Link or a Radio Link Set RL/RLs can not be combined with a release of a Radio Access Bearer RAB as with no Radio Link or Radio Link Set RL/RLs no Radio Access Bearer RAB can be released on that Radio Link or Radio Link Set RL/RLs. In step r a Radio Access Bearer RAB can be released for at least one user equipment. Further can the Radio Access Bearer RAB be chosen to be released firstly for the Radio Access Bearer RAB for the one user equipment with the highest quality of service QoS. In step s a dedicated physical channel for at least one User Equipment UE1 is switched to a common physical channel in the first Cell C1.

As a person skilled in the art appreciates, application of the invention is in no way limited to only cellular radio communication networks conforming to the WCDMA specifications. Thus the invention is also applicable in other Code Division Multiple Access (CDMA) based cellular communication system, e.g. cellular networks adhering to the IS-95 or the CDMA-2000 specifications, in which the UL power control is based on comparisons of Signal-to-Interference Ratio SIR to a SIR target SIRt.

The invention claimed is:

1. A method for detecting congestion in a first cell in a radio access network, wherein a radio network controller is serving at least a first Radio Base Station communicating with a plurality of user equipments each on a radio link/radio link set in said first cell, said method comprising the steps of:
   a) receiving a plurality of signal-to-interference ratio error reports, each report being estimated on measured signal-to-interference ratio and a signal-to-interference ratio target associated with said radio link/radio link set;
   b) measuring the amount of signal-to-interference ratio error reports being received at the radio network controller for said first cell; and,
   c) detecting a potential congestion in said first cell estimated on if said measured amount of signal-to-interference ratio error reports are above a certain first amount threshold for said first cell.

2. The method according to claim 1, wherein the method further comprises the step of:
   d) detecting a potential congestion in said first cell estimated on if the amount of reports being received for said first cell compared to the amount of radio links/radio link sets being connected in said first cell is above a certain second amount threshold for said first cell.

3. The method according to claim 1, wherein the method further comprises the step of:
   d) detecting a serious congestion in said first cell estimated on if said amount of signal-to-interference ratio error reports received is above a certain third amount threshold for said first cell.

4. The method according to claim 3, wherein said amount of signal-to-interference ratio error reports being above said certain third amount threshold for said first cell also having signal-to-interference ratio error below a certain first error threshold.

5. The method according to claim 1, wherein the measured amount of reports are estimated on reports being received during a certain time period.

6. The method according to claim 1, wherein if a potential congestion or a serious congestion is indicated in said first cell, the method further comprises at least one of the following steps:
   p) allowing no admission of new user equipments in said first cell;
   r) releasing at least one radio access bearer for at least one user equipment in said first cell; or, s) switching a dedicated physical channel for at least one user equipment to a common physical channel in said first cell.

7. The method according to claim 6, wherein the method step r is performed by releasing the one radio access bearer for the at least one user equipment with the highest quality of service.

8. The method according to claim 1, wherein if a potential congestion or a serious congestion is indicated in said first cell, the method further comprises at least one of the following steps:
   p) allowing no admission of new user equipments in said first Cell; or,
   q) releasing the radio link/radio link set for at least one user equipment in said first cell.

9. The method according to claim 8, wherein the at least one method step is/are performed in an order according to a known algorithm or according to a predetermined order for the at least one user equipment in said first cell.

10. The method according to claim 8, wherein the at least one method step is/are performed for the at least one user equipment that during a certain time period having sent a signal-to-interference ratio error report having the smallest signal-to-interference ratio error of all reports during that time in said first cell.

11. The method according to claim 10, wherein the at least one method step is/are performed for the next one user equipment that during said certain time period having sent a signal-to-interference ratio error report having the next smallest signal-to-interference ratio error of all reports during that said time period in said first cell.

12. The method according to claim 8, wherein the at least one method step is/are performed dependant on if a potential congestion is indicated or if a serious congestion is indicated.

13. The method according to claim 8, wherein the at least one method step is/are performed for all user equipments in said first cell having sent a signal-to-interference ratio error report with a signal-to-interference ratio error below said first error threshold.

14. The method according to claim 8, wherein the at least one method step is/are performed for all user equipments having sent a signal-to-interference ratio error report.

15. The method according to claim 1, wherein the signal-to-interference ratio error reports are being sent from said first Radio Base Station to said radio network controller.

16. A radio network controller for detecting congestion in a first cell in a radio access network, wherein said radio network controller is serving at least a first Radio Base Station communicating with a plurality of user equipments each on a radio link/radio link set in said first cell, said radio network controller comprising:
   a) means for receiving a plurality of signal-to-interference ratio error reports, each report being estimated on measured signal-to-interference ratio and a signal-to-interference ratio target associated with said radio link/radio link set;
   b) means for measuring the amount of signal-to-interference ratio error reports being received from said first Radio Base Station for said first cell; and,
   c) means for detecting a potential congestion in said first cell estimated on if said measured amount of signal-to-interference ratio error reports being received is above a certain first amount threshold for said first cell.

17. The radio network controller according to claim 16, wherein the radio network controller further comprises:
   c) means for detecting a potential congestion in said first cell estimated on if the amount of signal-to-interference ratio error reports being received for said first cell compared to the amount of radio links/radio link sets being connected in said first cell is above a certain second amount threshold for said first cell.

18. The radio network controller according to claim 16, wherein the radio network controller further comprises:
   c) means for detecting a serious congestion in said first cell estimated on if said amount of signal-to-interference ratio error reports being received is above a certain third amount threshold for said first cell.

19. The radio network controller according to claim 16, wherein the radio network controller further comprises:
   c) means for detecting a serious congestion in said first cell estimated on the measured amount of signal-to-interference ratio error reports being received having signal-to-interference ratio error below a certain first error threshold.

20. The radio network controller according to claim 16, wherein the measured amount of signal-to-interference ratio error reports are estimated on reports being received during a certain time period.

21. The radio network controller according to claim 16, wherein the radio network controller further comprises at least one of the following means:
   p) means for allowing no admission of new user equipments in said first cell, if a potential congestion or a serious congestion is indicated; or,
   q) means for releasing the radio link/radio link set for at least one user equipment, if a potential congestion or a serious congestion is indicated.

22. The radio network controller according to claim 16, wherein the radio network controller further comprises at least one of the following means:
   p) means for allowing no admission of new user equipments in said first cell, if a potential congestion or a serious congestion is indicated;
   r) means for releasing radio access bearers for at least one user equipment, if a potential congestion or a serious congestion is indicated; and/or
   s) means for switching a dedicated physical channel for at least one user equipment to a common physical channel, if a potential congestion or a serious congestion is indicated.

23. The radio network controller according to claim 22, wherein the means for releasing radio access bearers further comprises means for releasing the one radio access bearer with the highest quality of service for the at least one user equipment.

24. The radio network controller according to any claim 21, wherein the radio network controller further comprises at least one means which is/are performing according to a known algorithm or according to a predetermined order for the one user equipment in said first cell.

25. The radio network controller according to claim 21, wherein the radio network controller further comprises at least one of said means which is/are performing for the one user equipment that during a certain time period having sent a signal-to-interference ratio error report having the smallest signal-to-interference ratio error of all reports during that time.

26. The radio network controller according to claim 25, wherein the radio network controller further comprises at least one of said means which is/are performing for the next one user equipment that during said certain time period having sent a signal-to-interference ratio error report having the next smallest signal-to-interference ratio error of all reports during that said time period.

27. The radio network controller according to claim 21, wherein the radio network controller further comprises at least one of said means which is/are performing dependant on if a potential congestion is indicated or if a serious congestion is indicated.

28. The radio network controller according to claim 21, wherein the radio network controller further comprises at least one of said means which is/are performing for all user equipments having sent a signal-to-interference ratio error report with a signal-to-interference ratio error below said first error threshold.

29. The radio network controller according to claim 21, wherein the radio network controller further comprises at least one of said means which is/are performing for all user equipments having sent a signal-to-interference ratio error report.

* * * * *